US012785410B2

(12) United States Patent
Hodge et al.

(10) Patent No.: US 12,785,410 B2
(45) Date of Patent: Nov. 3, 2026

(54) HIERARCHICAL CONTROL OF UTILITY-SCALE, INVERTER-BASED GENERATION OF ELECTRIC POWER

(71) Applicants: THE REGENTS OF THE UNIVERSITY OF COLORADO, Denver, CO (US); ALLIANCE FOR ENERGY INNOVATION, LLC, Golden, CO (US)

(72) Inventors: Bri-Mathias Hodge, Golden, CO (US); Simon Julien, Boulder, CO (US); Amirhossein Sajadi, Madison, WI (US)

(73) Assignee: Alliance for Energy Innovation, LLC, Golden, CO (US)

( * ) Notice: Subject to any disclaimer, the term of this patent is extended or adjusted under 35 U.S.C. 154(b) by 503 days.

(21) Appl. No.: 18/551,422

(22) PCT Filed: Mar. 30, 2022

(86) PCT No.: PCT/US2022/022597
§ 371 (c)(1),
(2) Date: Sep. 20, 2023

(87) PCT Pub. No.: WO2022/212541
PCT Pub. Date: Oct. 6, 2022

(65) Prior Publication Data

US 2024/0178673 A1 May 30, 2024

Related U.S. Application Data

(60) Provisional application No. 63/168,636, filed on Mar. 31, 2021.

(51) Int. Cl.
*H02J 3/466* (2026.01)
*H02J 3/12* (2006.01)
(Continued)

(52) U.S. Cl.
CPC ................ *H02J 3/466* (2020.01); *H02J 3/12* (2013.01); *H02J 3/381* (2013.01); *H02J 2101/25* (2026.01)

(58) Field of Classification Search
CPC .... H02J 3/466; H02J 3/12; H02J 3/381; H02J 2101/25; H02J 2101/24; H02J 3/48; H02J 13/12; H02J 13/333
See application file for complete search history.

(56) References Cited

U.S. PATENT DOCUMENTS

2009/0096211 A1 4/2009 Stiesdal
2014/0375125 A1 12/2014 Ye et al.
(Continued)

FOREIGN PATENT DOCUMENTS

CN 115395566 A * 11/2022 ........... H02J 3/0014

OTHER PUBLICATIONS

International Search Report and Written Opinion received for PCT Patent Application No. PCT/US2022/022597, mailed on Jun. 28, 2022, 16 pages.

(Continued)

*Primary Examiner* — Mohammad Ali
*Assistant Examiner* — Sheela Rao
(74) *Attorney, Agent, or Firm* — Workman Nydegger

(57) ABSTRACT

The present disclosure relates generally to systems, methods, and apparatus for hierarchical control of utility-scale, inverter-based generation for mitigation of generation variability and responsive provisions of ancillary services. Such systems may include one or more processors, computer-readable media, and executable instructions which, if executed at the processors, configure the system to determine, at a first control layer, an inverter maximum power potential for a set of inverters, to determine, at the second control layer, an initial combined power output associated (Continued)

with the set of inverters and to determine a power support level and to transmit, from the second control layer to a third control layer, an indication of the power support level. The executable instructions may also configure the system to determine a first net power request, and to transmit, from the third control layer to the second control layer, an indication of the first net power request.

17 Claims, 5 Drawing Sheets

(51) Int. Cl.
*H02J 3/38* (2006.01)
*H02J 101/24* (2026.01)

(56) References Cited

U.S. PATENT DOCUMENTS

| | | | |
|---|---|---|---|
| 2014/0376289 | A1 | 12/2014 | Bixel et al. |
| 2017/0103483 | A1 | 4/2017 | Drees et al. |
| 2017/0149373 | A1 | 5/2017 | Aghatehrani et al. |
| 2017/0168516 | A1 | 6/2017 | King |
| 2020/0350780 | A1* | 11/2020 | Lundstrom .......... H02J 13/1311 |

OTHER PUBLICATIONS

Julien et al., "Hierarchical Control of Utility-Scale Solar PV Plants for Mitigation of Generation Variability and Ancillary Service Provision", Jul. 1, 2021, pp. 1-16.

* cited by examiner

HIERARCHICAL CONTROL OF UTILITY-SCALE, INVERTER-BASED GENERATION OF ELECTRIC POWER

CROSS-REFERENCE TO RELATED APPLICATIONS

This application is a U.S. National Stage of International Application No. PCT/US2022/022597, filed on Mar. 30, 2022, which claims the benefit of and priority to U.S. Provisional Patent Application Ser. No. 63/168,636 filed on Mar. 31, 2021 and entitled "CURTAILMENT CONTROL WITH STATISTICALLY OPTIMIZED TOPOLOGY FOR UTILITY SCALE VARIABLE GENERATION," each of the foregoing applications is are expressly incorporated herein by reference in their entirety.

GOVERNMENT RIGHTS

This invention was made with government support under grant number DE-AC36-08GO28308 awarded by the U.S. Department of Energy. The government has certain rights in the invention.

FIELD OF THE INVENTION

The present disclosure relates generally to electric power grids and more particularly to hierarchical control of utility-scale, inverter-based generation of electric power.

BACKGROUND

Electric power grids are complex networks in which electrical energy is produced by a diverse set of generation technologies and delivered to energy consumers via transmission and distribution lines. Primary sources of fuel for production of electric power include coal, oil, natural gas, nuclear, and hydro power. In recent years, however, electric power grids have transitioned toward inverter-based resources as costs associated with solar photovoltaic and wind resources continue to decline.

One challenge with integration and operation of power systems with increasing levels of wind and solar photovoltaic generation relates to the variable and uncertain nature of wind speeds and solar irradiance. Accordingly, wind and solar photovoltaic generation may be referred to as variable renewable energy sources. In some cases, the variability and uncertainty of such energy sources incentivizes producers to operate maximum instantaneous power which may result in extreme power fluctuations and may challenge the stability and reliability of power grids.

There exist many opportunities for new methods, systems, or improvements which may mitigate challenges associated with integration and operation of power systems that use variable renewable energy sources.

BRIEF SUMMARY

The present disclosure includes a system for power plant management. The system may include one or more processors and one or more computer-readable media having stored thereon executable instructions. The executable instructions, if executed at the one or more processors, configure the system to determine, at a first control layer, an inverter maximum power potential for each inverter of a first set of inverters. The first control layer is integrated into each inverter of the first set of inverters. The first set of inverters is associated with a first controller of a second control layer. The executable instructions may also configure the system to determine, at the first controller of the second control layer, an initial combined power output associated with the first set of inverters. The initial combined power output is based at least in part on the inverter maximum power potential for each inverter of the first set of inverters. The system may also determine, at the first controller of the second control layer, a power support level. The power support level is based at least in part on comparing the initial combined power output and a requested power generation level. The executable instructions may also configure the system to transmit, from the first controller of the second control layer to a third control layer, an indication of the power support level. Additionally, the system may determine, at the third control layer, a first net power request for the first controller of the second control layer based at least in part on the indicated power support level. The system may also transmit, from the third control layer to the first controller of the second control layer, an indication of the first net power request.

In another example, the present disclosure includes a method for power plant management. The method includes determining, at a first control layer, an inverter maximum power potential for each inverter of a first set of inverters. The first control layer is integrated into each inverter of the first set of inverters. The first set of inverters is associated with a first controller of a second control layer. The method includes determining, at the first controller of the second control layer, an initial combined power output associated with the first set of inverters. The initial combined power output based at least in part on the inverter maximum power potential for each inverter of the first set of inverters. Additionally, the method includes determining, at the first controller of the second control layer, a power support level. The power support level is based at least in part on comparing the initial combined power output and a requested power generation level. The method also includes transmitting, from the first controller of the second control layer to a third control layer, an indication of the power support level. Further, the method includes determining, at the third control layer, a first net power request for the first controller of the second control layer based at least in part on the indicated power support level. Further still, the method includes transmitting, from the third control layer to the first controller of the second control layer, an indication of the first net power request.

In another example, the present disclosure includes a non-transitory computer-readable medium comprising one or more computer-readable storage media having stored thereon computer-executable instructions that, if executed at a processor, cause a computer system to perform a method for power plant management. The method includes determining, at a first control layer, an inverter maximum power potential for each inverter of a first set of inverters. The first control layer is integrated into each inverter of the first set of inverters. The first set of inverters is associated with a first controller of a second control layer. The method includes determining, at the first controller of the second control layer, an initial combined power output associated with the first set of inverters. The initial combined power output based at least in part on the inverter maximum power potential for each inverter of the first set of inverters. Additionally, the method includes determining, at the first controller of the second control layer, a power support level. The power support level is based at least in part on comparing the initial combined power output and a requested power generation level. The method also includes transmitting, from the first controller of the second control layer to a third control layer, an indication of the power support level. Further, the method includes determining, at the third control layer, a first net power request for the first controller of the second control layer based at least in part on the indicated power support level. Further still, the method includes transmitting, from the third control layer to the first controller of the second control layer, an indication of the first net power request.

These and other objects and features of the present disclosure will become more fully apparent from the following description and appended claims or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only illustrated embodiments of the disclosure and are therefore not to be considered limiting of its scope. The disclosure will be described and explained with additional specificity and detail through the use of the accompanying drawings described below.

DETAILED DESCRIPTION

Figure 1:
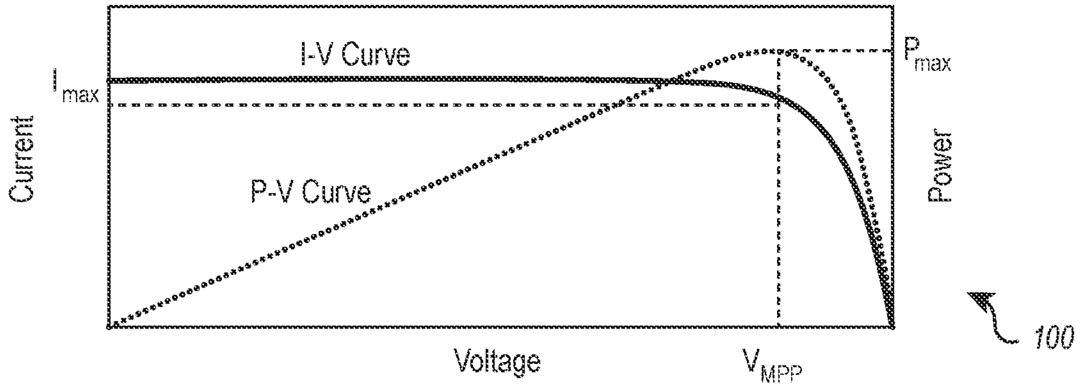
FIG. 1 illustrates an example of a plot of inverter behavior under variable voltage levels.

Disclosed embodiments relate generally to power plant management generally and more particularly to hierarchical control of utility-scale, inverter-based generation for mitigation of generation variability and responsive provisions of ancillary services. In one example, the present disclosure describes a system for power plant management that includes one or more processors and one or more computer-readable media having stored thereon executable instructions. The executable instructions may be executed at one or more processors such that the executable instructions configure the system to perform various acts.

For example, the system may determine, at a first control layer, an inverter maximum power potential for each inverter of a first set of inverters. The first control layer may be integrated into each inverter of the first set of inverters and the first set of inverters may be associated with a first controller of a second control layer. The system may also determine, at the first controller of the second control layer, an initial combined power output associated with the first set of inverters such that the initial combined power output is based at least in part on the inverter maximum power potential for each inverter of the first set of inverters. The system may determine, at the first controller of the second control layer, a power support level such that the power support level is based at least in part on comparing the initial combined power output and a requested power generation level. The system may also transmit, from the first controller of the second control layer to a third control layer, an indication of the power support level. The system may determine, at the third control layer, a first net power request for the first controller of the second control layer based at least in part on the indicated power support level. The system may also transmit, from the third control layer to the first controller of the second control layer, an indication of the first net power request. Similarly, the present disclosure may include other systems, methods, computer-readable media, etc. which describe or otherwise enable hierarchical control of utility-scale, inverter-based generation.

Aspects of the present disclosure may be implemented to mitigate challenges associated with integrating an increasing level of inverter-based resources (e.g., solar photovoltaic or wind) into electric power grids. One challenge with the integration and operation of power systems with an increasing level of wind or solar voltaic generation relates to the variable and uncertain nature of wind speeds and solar irradiance. As such, wind or solar voltaic generation may be referred to as variable renewable energy sources. For example, the rapid formation and movement of clouds often creates undesired fluctuation in power plant output. Due to this uncertainty, such variable renewable energy sources are not treated as non-firm power (i.e., power that is traded at lower cost due to the lack of an availability guarantee), nor have been relied on for providing regulation reserves or other forms of ancillary services. The lack of consistent and dispatchable power production paired with the current power market structure incentivizes power producers to operate at maximum instantaneous power regardless of an operational state of a power grid, which may result in extreme power fluctuations and may challenge the stability and reliability of power grids operating with high shares of variable renewable energy sources.

If integration of variable renewable energy resources continues to increase, there may be opportunities for new methods or systems that enable an increase in power plant flexibility and reliability. In some cases, this may include development of control algorithms for situations in which operators implement hybrid power plants which use energy storage or fossil-fueled, dispatchable forms of generation to enhance a power plant's flexibility. However, such an approach increases capital costs and complicates market procedures. In other cases, this may include development of control algorithms for variable renewable energy technologies that provide functionality for ancillary services without a need for additional resources (e.g., without reliance on fossil-fueled or other dispatchable forms of generation).

One such control algorithm may include a hierarchical control system for utility-scale photovoltaic solar power plants that enables techniques for mitigating generation variability and for providing ancillary services accurately, even in changing weather conditions. The hierarchical control architecture may offer a distributed decision-making process at multiple layers and time scales, which may allow it to send specific directed control signals to each individual inverter in an inverter-based power generation system. For example, a hierarchical control system may include a direct control layer integrated into each inverter in the system and which may be configured to adjust or otherwise control inverter operation. In some embodiments, each inverter is associated with one or more microcontrollers. Software code that is configured to implement the first control layer may be installed on the microcontrollers. Direct control agents (e.g., inverters) may be grouped and managed by controllers in a supervisory control layer. The supervisory control layer may manage power output from the group of inverters in order to respond to power requests generated by a central controller that is part of an adaptive control layer. The supervisory control layer may be implemented by one or more processors at a power utility server, positioned in the field, or located in a cloud-based solution. The one or more processors may execute software that is configured to implement the supervisory control layer. Similarly, the central controller may be implemented by one or more processors at a power utility server, positioned in the field, or located in a cloud-based solution. The one or more processors may execute software that is configured to implement the central controller. In some embodiments, the same one or more processors that implement a supervisory control layer may also implement the central controller. Decision-making at each layer may occur at different time intervals or with different levels of specificity to reduce resource utilization at each layer (e.g. computational power, memory, communication bandwidth, etc.) or to more effectively adapt to changing generation demands or environmental variation.

Aspects of the present disclosure may be implemented to realize one or more advantages. For example, implementing a hierarchical control system may enable more stable or reliable power production for power plants utilizing a high percentage of variable renewable energy sources. More reliable power production may allow for an increased reliance on renewable energy resources and participation of renewable energy resources in ancillary service markets. Additional aspects of the present disclosure, including examples, advantages, etc., will be described herein with reference to a plot of inverter behavior, a hierarchical control system, a communication scheme, additional system diagrams, and method flows. An additional advantage of a hierarchical control system is the ability to coordinate power decisions by more than one centralized decision maker. For example, the various layers may be aware of each other as layers, but generally unaware of the contents of each layer. For example, the central controller may be aware of the supervisor control layers, but within each supervisor control layer decisions may be made without the knowledge or impact of the central control layer.

FIG. 1 illustrates an example of a plot 100 of inverter behavior under variable voltage levels, which may illustrate or otherwise be associated with aspects of the present disclosure. For example, the plot 100 may illustrate how curtailment control may be utilized to manage power output of an inverter. The curtailment of power production from a solar PV array principally means reducing its power output to a specified fraction of its maximum power potential. Curtailment is achieved by the adjustment of the voltage and current output of solar PV array or wind turbine.

For example, a system may implement curtailment control to reduce power output to a specified fraction of a maximum power potential of an inverter. As shown in the plot 100, curtailment is achieved by adjusting the voltage and current levels of, for example, solar photovoltaic arrays (e.g., by using power electronic equipment to change parameter set points). For example, the plot 100 shows (e.g., in the Power-Voltage curve of the plot 100) that power output is based on voltage levels. Adjusting levels of set points may result in changes to a total output of a power plant. Adjusting the operation set point of the power electronic equipment may result in enough headroom becoming available to enable ramping up production if a greater generation level is requested (e.g., by an electric power grid). Implementing curtailment control may lead to an increased operational flexibility and may enable a power plant to maintain a consistent power output (e.g., in a case of partial shading or rapid cloud movements). Similarly, available headroom may provide ancillary services to a power grid (e.g., frequency response or voltage support). Implementing curtailment control systems based on or otherwise associated with behavior illustrated by the plot 100 may enable an increased efficiency, stability, or reliability of power plants or electric grids with a high percentage of variable renewable energy resources.

Figure 2:
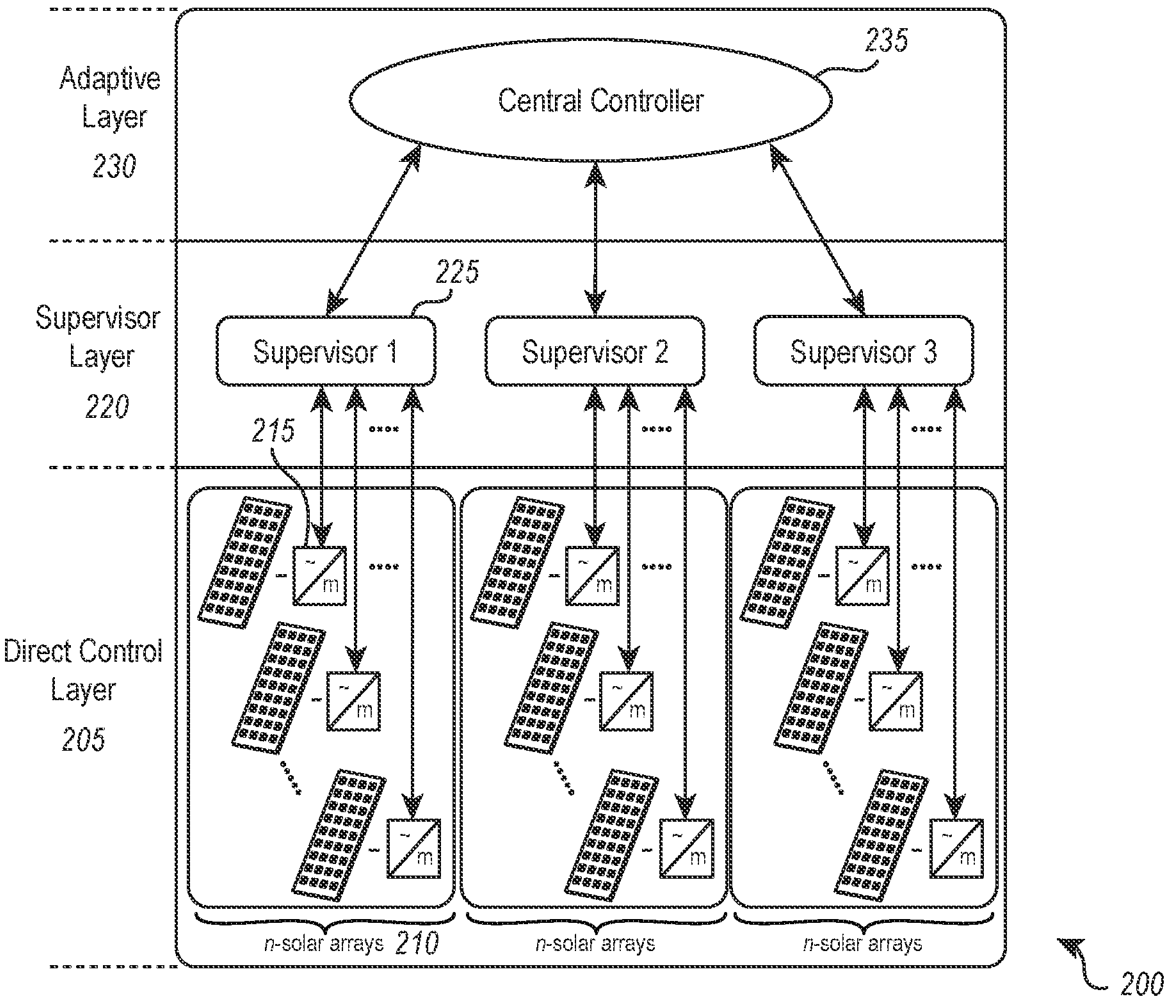
FIG. 2 illustrates an example of a hierarchical control system that supports hierarchical control of utility-scale, inverter-based generation, in accordance with aspects of the present disclosure, with solar photovoltaic used here as an example.

FIG. 2 illustrates an example of a hierarchical control system 200 that supports hierarchical control of utility-scale, inverter-based generation, in accordance with aspects of the present disclosure. In some examples, the hierarchical control system 200 may implement aspects of or otherwise be associated with the plot 100, as described with reference to FIG. 1. The hierarchical control system 200 may include a first control layer (e.g., a direct control layer 205), a second control layer (e.g., a supervisor layer 220), and a third control layer (e.g., an adaptive layer 230). The direct control layer 205, the supervisor layer 220, and the adaptive layer 230 may perform various tasks relating to managing power output and inverter headroom in a power plant (e.g., a wind or solar photovoltaic power plant).

The direct control layer 205 may include a set of n solar arrays 210, each of which is associated with an inverter 215. Each inverter 215 may have an integrated control agent (e.g., a microcontroller or other type of processor) configured to manage operating parameters of the inverter 215 such as voltage or current to directly regulate power output of the inverter 215. In accordance with the present disclosure, a control agent associated with an inverter 215 may compute or otherwise determine an estimated inverter maximum power potential of the inverter 215. The control agent may determine whether the inverter maximum power potential is above a requested power output. If the inverter maximum power potential is less than the requested power output, the control agent may transmit a signal or other indication to the supervisor layer 220. For example, the comparison of the inverter maximum power potential to the requested power output may result in a residual power metric. If the residual power metric is positive, the control agent may determine that the inverter 215 has available headroom. If the residual power metric is negative, the control agent may determine that the inverter maximum power potential is less than the requested power output and may signal the supervisor layer 220 accordingly. The inverter maximum power potential calculations and associated comparisons may be performed by each control agent of the set of n solar arrays 210.

The supervisor layer 220 may include a set of supervisor controllers 225 configured to each manage a set of control agents of the direct control layer 205 associated with a set of n solar arrays 210. The supervisor controllers 225 may determine a performance metric of the set of control agents (e.g., the set of inverters 215). For example, a supervisor controller 225 may determine an initial combined power output for the combined set of direct control agents which it manages and may provide a power set point for each direct control agent based on a power generation request point received from the adaptive layer 230. The supervisor controller 225 may also determine a power support level indicating a deficit between the initial combined power output of the inverters 215 and the power generation request point. For example, the supervisor controller 225 may calculate a sum of all residual power metrics from each inverter 215 (e.g., determined via the direct control agent) to determine whether the set of inverters 215 has a power surplus or a power deficit. The resulting value may be transmitted to the adaptive layer 230.

If the supervisor layer 220 determines that there is a power deficit at one or more inverters 215, the supervisor layer 220 may perform a method for correlative neighboring. The supervisor layer 220 may train a correlation matrix to describe the correlation of headroom availability among all inverters 215. A time scale associated with the correlation matrix may vary based on meteorological characteristics of the site and pace of cloud movements (and similarly the pace of wind variations in the case of wind turbines). For example, the higher the elevation, the faster the clouds move and the shorter the time scale. The correlation matrix may provide an indication of how correlated operating conditions are between inverters 215 of the n solar arrays 210 managed by the supervisor controller 225. In at least one embodiment, the correlation matric may be calculated using a Pearson's Linear Correlation Coefficient as described below in Equation 1:

$$C(X, Y) = \frac{\sum_{i=1}^{t}(X_i - \underline{X})(Y_i - \underline{Y})}{\sqrt{\sum_{i=1}^{t}(X_i - \underline{X})^2 \sum_{i=1}^{t}(Y_i - \underline{Y})^2}}$$

If the supervisor controller 225 determines that an inverter 215 has a power deficit, the supervisor controller 225 may adjust operating parameters of a set of inverters 215 starting with the inverters 215 which are the least correlated to the inverter 215 with the power deficit (e.g., if an inverter 215 is partially shaded, then an inverter 215 with a low correlation is more likely to be unshaded). The set of inverters 215 with low correlation, C(X, Y), may be referred to as a set of virtual neighbors. As such, virtual neighbors may be associated with a same supervisor controller 225 but may be distributed across a large geographic installation site or may be located at two or more geographic installation sites (e.g., on opposite ends of a power plant). Similarly, inverters 215 associated with a first supervisor controller 225 may be distributed across a geographic installation site that overlaps with inverters 215 associated with a second supervisor controller 225. Computing the correlation matrix may lead to a more efficient process for determining what inverters 215 have available headroom or are most likely to be operating at a surplus when other inverters 215 are operating at a deficit. In some examples, the supervisor layer 220 may include multiple hierarchical layers such that a supervisor controller 225 may manage a set of supervisor controllers 225 or may be managed by a supervisor controller 225. Layering controllers may allow for efficient, granular control of operating parameters.

Each supervisor controller 225 of the supervisor layer 220 may calculate power output or power support levels and may provide a corresponding indication to the adaptive layer 230. The adaptive layer 230 may include a central controller 235 configured to manage a set of supervisor controllers 225. The central controller 235 may also manage power generation requests or ancillary service requests from third-parties (e.g., electric power grids or markets). The central controller 235 may receive signaling from each supervisor controller 225 and may determine power generation requests for each supervisor controller 225 based on the power support or output levels indicated by each supervisor controller 225. For example, if a first supervisor controller 225 indicates a power support level (e.g., because the supervisor controller 225 is operating at a deficit), the central controller 235 may indicate a second supervisor controller 225 to provide an increased power output (e.g., if the second supervisor controller 225 is operating at a surplus or has available headroom). The central controller 235 may transmit signaling or otherwise indicate power request levels to each supervisor controller 225 and each supervisor controller 225 may relay power set points to each direct control agent associated with inverters 215. The direct control agents may adjust operating parameters such as voltage or current for each inverter 215 to satisfy requested curtailment or power generation levels. In some examples, the central controller 235 or other components of the hierarchical control system 200 may have a predictive forecasting capability such that the system is capable of determining a near-term to long-term approximation of generation potential across the power plant. The long-term approximation may be based on inverter performance, available headroom, weather conditions, or other such factors.

In some examples, a power plant may have storage units such as electrochemical batteries, fuel cells, or other types of energy storage devices. In such examples, the supervisor control layer 220 may determine where to direct power that is output by inverters 215. For example, based on available headroom, requested power generation levels, etc., a supervisor controller 225 may determine to charge a storage device rather than direct power to a power grid. Directing power in this manner may lead to fewer charge or discharge cycles for storage units which may lead to an increased life of storage devices or an increased efficiency. Implementing aspects of the hierarchical control system 200 may reduce signaling or computation overhead for control systems, may increase the speed at which a system can adapt to changing conditions, or may increase the reliability or accuracy of computation or power plant operation. Similarly, the hierarchical control system 200 may be implemented by a variety of computing systems, such as edge computing systems, cloud computing systems, etc. which may result in flexible deployment.

Figure 3:
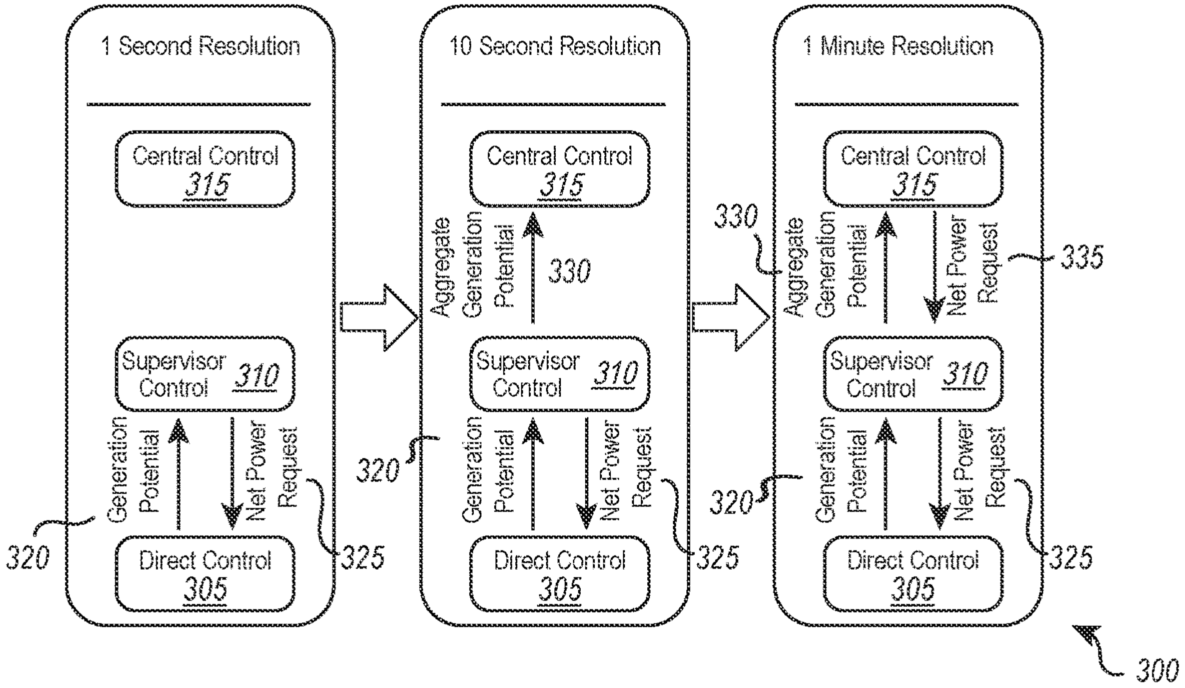
FIG. 3 illustrates an example of a communication scheme that supports hierarchical control of utility-scale, inverter-based generation, in accordance with aspects of the present disclosure.

FIG. 3 illustrates an example of a communication scheme 300 that supports hierarchical control of utility-scale, inverter-based generation, in accordance with aspects of the present disclosure. In some examples, the communication scheme 300 may be implemented by or otherwise associated with aspects of the plot 100 or the hierarchical control system 200, as described with reference to FIGS. 1 and 2. For example, the communication scheme 300 may be used by a system having a direct control layer 305, a supervisor control layer 310, and a central controller 315. The communication scheme 300 illustrates example time scales at which computation or signaling occurs. Though presented as one second, ten seconds, or one minute scales, computation or signaling may occur at any interval based on operation conditions of a system. In some examples, time scales may be determined based on environmental conditions such as wind speed, cloud movement, etc.

For example, at a highest resolution (e.g., every second), the direct control layer 305 may transmit a generation potential 320 to the supervisor control layer 310. At the same resolution, the supervisor control layer 310 may transmit a net power request 325 to the direct control layer 305 indicating a power set point for a set of inverters associated with the direct control layer 305. In some examples, the direct control layer 305 may transmit the generation potential 320 at one time scale but may calculate the generation potential at a smaller time scale. At a lower resolution (e.g., every ten seconds) the supervisor control layer 310 may transmit an aggregate generation potential 330 (e.g., initial combined power output level) to the central controller 315. In some examples, the aggregate generation potential 3300 may include an indication of a power support level requested by the supervisor control layer 310. At a lowest resolution (e.g., every minute), the central controller 315 may transmit an indication of a net power request 335 to the supervisor control layer 310. Implementing aspects of the communication scheme 300 may enable an increased flexibility and efficiency in control systems associated with variable renewable energy sources.

Figure 4:
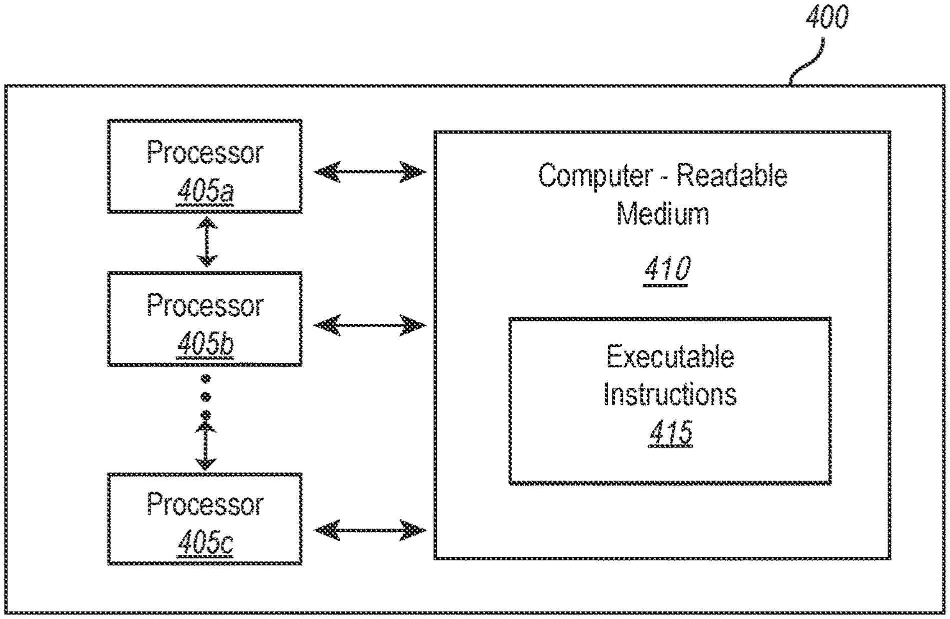
FIGS. 4 and 5 illustrate examples of a system of subsystems that support hierarchical control of utility-scale, inverter-based generation, in accordance with aspects of the present disclosure.

FIG. 4 illustrates an example of a computer system 400 that supports hierarchical control of utility-scale, inverter-based generation, in accordance with aspects of the present disclosure. In some examples, the system 500 may implement or otherwise be associated with aspects of the plot 100, the hierarchical control system 200, or the communication scheme 300, as described with reference to FIGS. 1-3. The computer system 400 may include one or more processors 405 (e.g., a processor 405*a*, a processor 405*b*, a processor 405*c*, etc.), a computer-readable medium 410, and a set of executable instructions 415. The one or more processors 405 may include micro-controllers (e.g., microcontrollers integrated within inverters), general purpose processors, central processing units, graphics processing units, digital signal processors, application specific integrated circuits, field-programmable gate arrays, or any combination thereof. The computer system 400 may be an example of means for performing methods or functions of the present disclosure, as described herein.

For example, the set of executable instructions 415 may include instructions which, if executed at the one or more processors 405, may cause the computer system 400 to perform at least the following: determine, at a first control layer, an inverter maximum power potential for each inverter of a first set of inverters, the first control layer integrated into each inverter of the first set of inverters, the first set of inverters associated with a first controller of a second control layer; determine, at the first controller of the second control layer, an initial combined power output associated with the first set of inverters, the initial combined power output based at least in part on the inverter maximum power potential for each inverter of the first set of inverters; determine, at the first controller of the second control layer, a power support level, the power support level based at least in part on comparing the initial combined power output and a requested power generation level; transmit, from the first controller of the second control layer to a third control layer, an indication of the power support level; determine, at the third control layer, a first net power request for the first controller of the second control layer based at least in part on the indicated power support level; and transmit, from the third control layer to the first controller of the second control layer, an indication of the first net power request.

Implementing aspects of the computer system 400 may enable an increased efficiency, stability, or reliability of power plants or electric grids with a high percentage of variable renewable energy resources.

Figure 5:
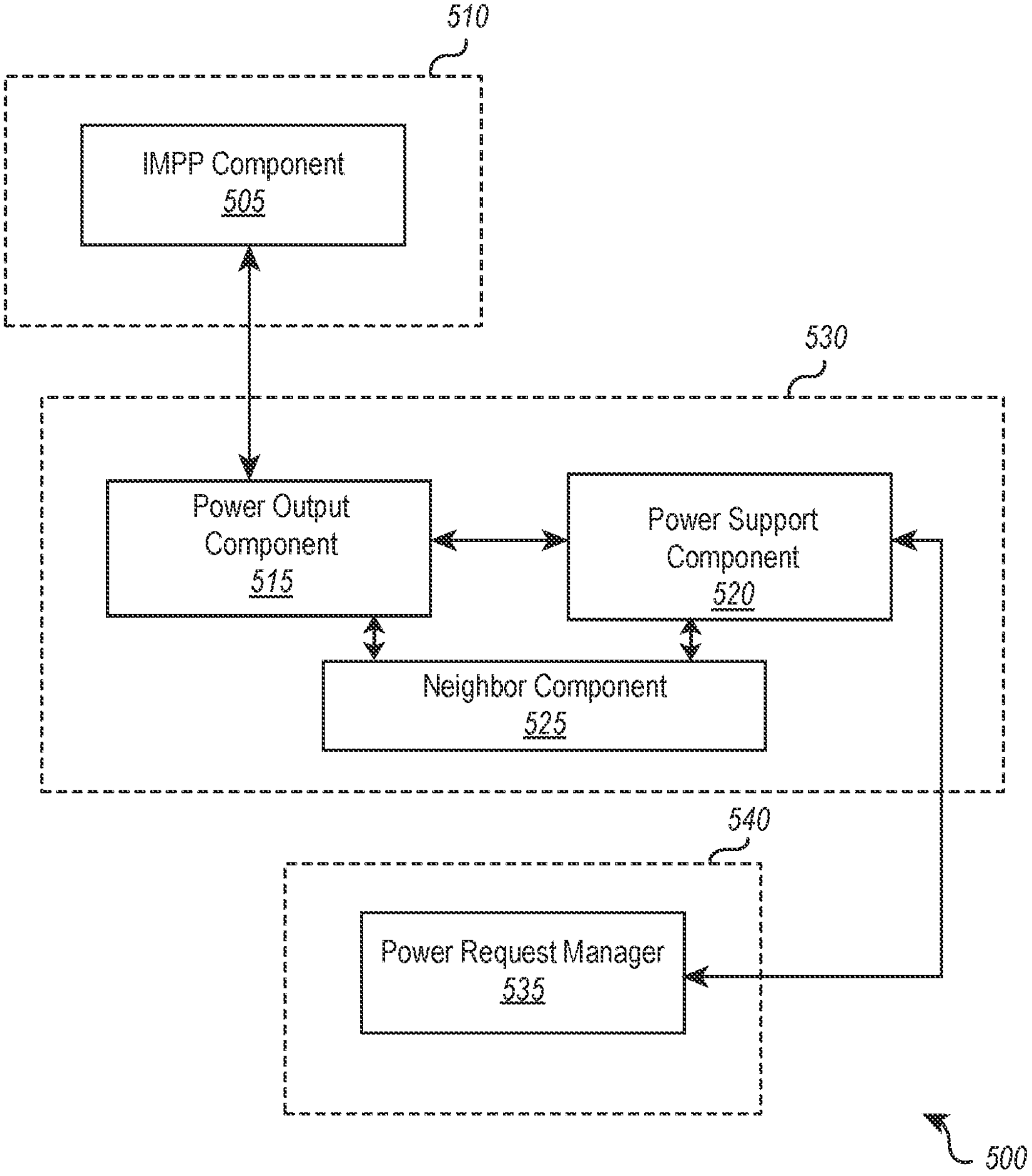

FIG. 5 illustrates an example of a system 500 that supports hierarchical control of utility-scale, inverter-based generation, in accordance with aspects of the present disclosure. In some examples, the system 500 may implement or otherwise be associated with aspects of the plot 100, the hierarchical control system 200, the communication scheme 300, or the system 400, as described with reference to FIGS. 1-4. For example, the system 500 may be implemented by one or more processors or computer-readable media, as described herein. The combination of the one or more processors and computer executable code may be referred to as a "component." The system 500 may include an inverter maximum power potential component 505, which may be part of a first control layer 510. The system 500 may also include a power output component 515, a power support component 520, and a neighbor component 525, which may each be part of a second control layer 530. The system 500 may also include a power request manager 535, which may be part of a third control layer 540. In some examples, the system 500 may include additional components or components may be removed or altered. The system 500 may be an example of means for performing methods and functions of the present disclosure, as described herein.

The inverter maximum power potential component 505 may determine, at the first control layer 510, an inverter maximum power potential for each inverter of a first set of inverters, the first control layer 510 integrated into each inverter of the first set of inverters, the first set of inverters associated with a first controller of the second control layer 530. In some examples, the inverter maximum power potential component 505 may calculate the inverter maximum power potential iteratively for each inverter of the first set of inverters at a first time interval that is less than a second time interval associated with solar or wind variation.

The power output component 515 may determine, at the first controller of the second control layer 530, an initial combined power output associated with the first set of inverters, the initial combined power output based at least in part on the inverter maximum power potential for each inverter of the first set of inverters. In some examples, determining the initial combined power output may include calculating, at the inverter maximum power potential component 505 of the first control layer 510, a residual generation signal based on comparing the inverter maximum power potential and a generation set point and transmitting, from the first control layer 510 to the first controller of the second control layer 530, an indication of the residual generation signal for each inverter of the first set of inverters. The initial combined power output is based on a sum of each residual generation signal.

The power support component 520 may determine, at the first controller of the second control layer 530, a power support level, the power support level based on comparing the initial combined power output and a requested power generation level.

The power support component 520 may transmit, to the third control layer 540, an indication of the power support level.

The power request manager 535 may determine, at the third control layer 540, a first net power request for the first controller of the second control layer 530 based on the indicated power support level.

In some examples, the power request manager 535 may determine, at the third control layer 540, a second net power request for a second controller of the second control layer 530 based on the indicated power support level associated with the first controller of the second control layer 530, the second controller of the second control layer associated with a second set inverters.

The power request manager 535 may transmit, from the third control layer 540 to the first controller of the second control layer 530, an indication of the first net power request. In some examples, the power request manager 535 may transmit, from the third control layer 540 to the second controller of the second control layer 530, an indication of the second net power request.

In some examples, the third control layer 540 may receive a request signal associated with one or more ancillary services such that the power request manager 535 may determine net power requests based on receiving the request signal. In some implementations, the one or more ancillary services may include frequency response, voltage support, or other ancillary service requests.

In some examples, the neighbor component 525 may determine, at the first controller of the second control layer 530, a set of virtual neighbors, the set of virtual neighbors comprising one or more inverters of the first set of inverters. In some implementations, the neighbor component 525 may calculate a correlation matrix. The correlation matrix may be calculated based upon historical data or real-time data indicating fluctuations between different inverters. As such, the correlation matrix indicates a correlation of operating conditions between each inverter of the first set of inverters. The inverters can be grouped into sets of virtual neighbors based upon the respective inverters being associated with correlation below a threshold. In some examples, the one or more inverters of the set of virtual neighbors are distributed across a large geographic installation site or across two or more different geographic installation sites.

In some examples, the first control layer 510 includes a set of control agents configured to control operating parameters associated with each inverter of the first set of inverters, the second control layer 530 includes a set of controllers configured to each manage a set of control agents associated with the first control layer 510, and the third control layer 540 includes a central controller configured to manage the set of controllers associated with the second control layer 530. In some implementations, the second control layer 530 may include two or more hierarchical levels of controllers such that a higher layer of controllers is configured to manage a lower layer of controllers within the second control layer 530. In some examples, the system 500 may also include one or more storage devices such that controllers of the second control layer 530 determine to direct power to the one or more storage devices. Implementing aspects of the system 500 may enable an increased efficiency, stability, or reliability of power plants or electric grids with a high percentage of variable renewable energy resources.

Figure 6:
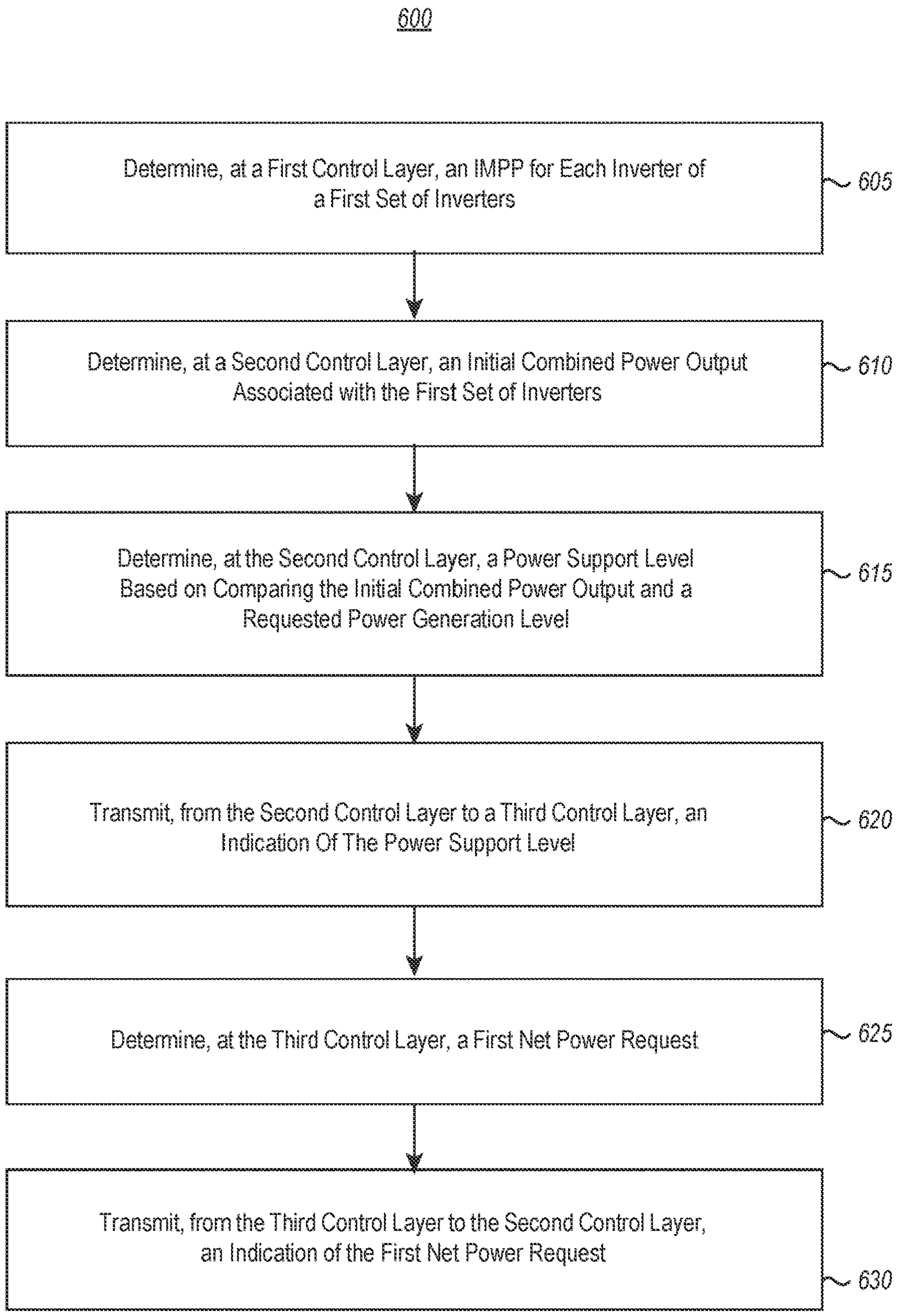
FIGS. 6 and 7 illustrate examples of method flows that support hierarchical control of utility-scale, inverter-based generation, in accordance with aspects of the present disclosure.

FIG. 6 illustrates an example of a method flow 600 that supports hierarchical control of utility-scale, inverter-based generation, in accordance with aspects of the present disclosure. In some examples, the method flow 600 may be implemented by or otherwise associated with aspects of the plot 100, the hierarchical control system 200, the communication scheme 300, or the system 400 or 500, as described with reference to FIGS. 1-5. For example, the method flow 600 may be implemented by a system having one or more processors and computer-readable media having stored thereon executable instructions that, if executed at the one or more processors, configures the system to perform the steps of the method flow 600. Steps of the method flow 600 may be performed in a different order than illustrated or steps may be added or removed.

At 605, the method flow 600 may include, determining, at a first control layer, an inverter maximum power potential for each inverter of a first set of inverters. The first control layer may be integrated into each inverter of the first set of inverters and the first set of inverters may be associated with a first controller of a second control layer.

At 610, the method flow 600 may include determining, at the first controller of the second control layer, an initial combined power output associated with the first set of inverters, the initial combined power output based on the inverter maximum power potential for each inverter of the first set of inverters.

At 615, the method flow 600 may include determining, at the first controller of the second control layer, a power support level, the power support level based on comparing the initial combined power output and a requested power generation level.

At 620, the method flow 600 may include transmitting, from the first controller of the second control layer to a third control layer, an indication of the power support level.

At 625, the method flow 600 may include determining, at the third control layer, a first net power request for the first controller of the second control layer based at least in part on the indicated power support level.

At 630, the method flow 600 may include transmitting, from the third control layer to the first controller of the second control layer, an indication of the first net power request. Implementing aspects of the method flow 600 may enable an increased efficiency, stability, or reliability of power plants or electric grids with a high percentage of variable renewable energy resources.

Figure 7:
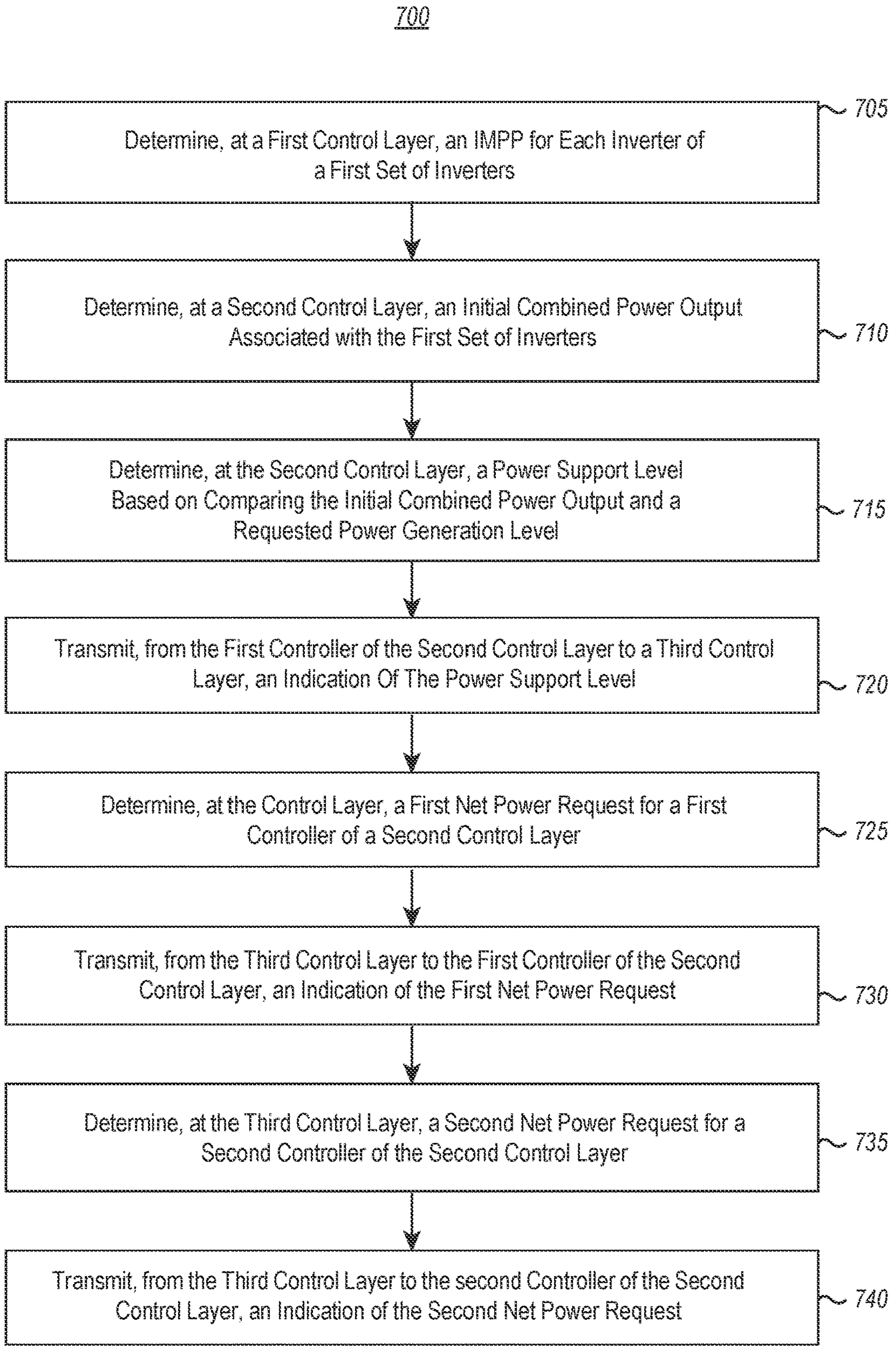

FIG. 7 illustrates an example of a method flow 700 that supports hierarchical control of utility-scale, inverter-based generation, in accordance with aspects of the present disclosure. The method flow 700 may be implemented by or otherwise associated with the plot 100, the hierarchical control system 200, the communication scheme 300, the system 400 or 500 or the method flow 600, as described with reference to FIGS. 1-6. For example, the method flow 700 may be implemented by a system having one or more processors and computer-readable media having stored thereon executable instructions that, if executed at the one or more processors, configures the system to perform the steps of the method flow 700. Steps of the method flow 700 may be performed in a different order than illustrated or steps may be added or removed.

At 705, the method flow 700 may include, determining, at a first control layer, an inverter maximum power potential for each inverter of a first set of inverters. The first control layer may be integrated into each inverter of the first set of inverters and the first set of inverters may be associated with a first controller of a second control layer.

At 710, the method flow 700 may include determining, at the first controller of the second control layer, an initial combined power output associated with the first set of inverters, the initial combined power output based on the inverter maximum power potential for each inverter of the first set of inverters.

In some examples, determining the initial combined power output may include calculating, at the first control layer and for each inverter of the first set of inverters, a residual generation signal based on comparing the inverter maximum power potential and a generation setpoint and transmitting, from the first control layer to the first controller of the second control layer, an indication of the residual generation signal for each inverter of the first set of inverters. As such, the initial combined power output may be based on a sum of each residual generation signal or each inverter of the first set of inverters.

At 715, the method flow 700 may include determining, at the first controller of the second control layer, a power support level, the power support level based on comparing the initial combined power output and a requested power generation level.

At 720, the method flow 700 may include transmitting, from the first controller of the second control layer to a third control layer, an indication of the power support level.

At 725, the method flow 700 may include determining, at the third control layer, a first net power request for the first controller of the second control layer based at least in part on the indicated power support level.

At 730, the method flow 700 may include transmitting, from the third control layer to the first controller of the second control layer, an indication of the first net power request.

At 735, the method flow 700 may include determining, at the third control layer, a second net power request for a second controller of the second control layer based on the indicated power support level associated with the first controller of the second control layer, the second controller of the second control layer associated with a second set of inverters.

At 740, the method flow 700 may include transmitting, from the third control layer to the second controller of the second control layer, an indication of the second net power request. Implementing aspects of the method flow 700 may enable an increased efficiency, stability, or reliability of power plants or electric grids with a high percentage of variable renewable energy resources.

Although the subject matter is described herein using language specific to structural features or methodological steps, it is understood that the subject matter defined in the appended claims is not limited to the described features or steps described herein, or the order of the steps described herein. Rather, the described features or acts are described as example forms of implemented the appended claims.

The present disclosure may include or utilize a special-purpose or general-purpose computer system that includes computer hardware such as, for example, one or more processors or system memory (e.g., computer-readable media), as discussed herein. Examples within the scope of the present disclosure may include general-purpose processors, embedded systems, microcontrollers, application-specific integrated circuits, field-programmable gate arrays, or any other such device capable to execute instructions. Examples within the scope of the present disclosure may also include physical or other computer-readable media for carrying or storing computer-executable instructions or data structures. Such computer-readable media may be any available media that can be accessed by a general-purpose or special-purpose computer system. Computer-readable media (e.g., non-transitory computer-readable media) that store computer-executable instructions or data structures may be referred to as computer storage media. Computer-readable media that carry executable instructions or data structures may be referred to as transmission media. Examples may include at least two distinctly different types of computer-readable media, namely computer storage media or transmission media.

Computer storage media are physical storage media that store computer-executable instructions or data structures. Physical storage media include computer hardware, such as random-access memory (RAM), read-only memory (ROM), electrically erasable programmable ROM (EEPROM), solid state drives (SSDs), flash memory, phase-change memory (PCM), spin transfer torque RAM (STT-RAM) magnetic RAM (MRAM), optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the disclosure.

Transmission media can include a network or data links which can be used to carry program code in the form of computer-executable instructions or data structures, and which can be accessed by a general-purpose or special-purpose computer system. A network is defined as one or more data links that enable the transport of electronic data between computer systems or modules or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a NIC), and then eventually transferred to computer system RAM or to less volatile computer storage media at a computer system. Thus, it should be understood that computer storage media can be included in computer system components that utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Aspects of the disclosure may be practiced in network computing environments may types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Similarly, the disclosure may be precited in distributed system environments in which local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The disclosure may also be practiced in a cloud-computing environment. Cloud computing environments may be distributed, although this is not required. If distributed, cloud computing environments may be distributed internationally within an organization or have components possessed across multiple organizations. In this description and the following claims, cloud computing is defined as a model for enabling on-demand network access to a shared pool of configurable computing resources (e.g., networks, servers, storage, applications, and services). The definition of cloud computing is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some examples, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention is further specified in the following aspects.

Aspect 1: A system for power plant management, comprising: one or more processors; and one or more computer-readable media having stored thereon executable instructions that, if executed at the one or more processors, configure the system to perform at least the following: determine, at a first control layer, an inverter maximum power potential for each inverter of a first set of inverters, the first control layer integrated into each inverter of the first set of inverters, the first set of inverters associated with a first controller of a second control layer; determine, at the first controller of the second control layer, an initial combined power output associated with the first set of inverters, the initial combined power output based at least in part on the inverter maximum power potential for each inverter of the first set of inverters; determine, at the first controller of the second control layer, a power support level, the power support level based at least in part on comparing the initial combined power output and a requested power generation level; transmit, from the first controller of the second control layer to a third control layer, an indication of the power support level; determine, at the third control layer, a first net power request for the first controller of the second control layer based at least in part on the indicated power support level; and transmit, from the third control layer to the first controller of the second control layer, an indication of the first net power request.

Aspect 2: The system of any preceding aspect, wherein the executable instructions further comprise instructions that, if executed at the one or more processors, configure the system to: determine, at the third control layer, a second net power request for a second controller of the second control layer based at least in part on the indicated power support level associated with the first controller of the second control layer, the second controller of the second control layer associated with a second set of inverters; and transmit, from the third control layer to the second controller of the second control layer, an indication of the second net power request.

Aspect 3: The system of any preceding aspect, wherein: the first set of inverters are distributed across a power plant comprising one or more geographic installation sites; and the first set of inverters are configured to communicate wirelessly within the first set of inverters or with a controller of the second control layer.

Aspect 4: The system of any preceding aspect, wherein the executable instructions further comprise instructions that, if executed at the one or more processors, configure the system to: determine, at the first controller of the second control layer, a set of virtual neighbors, the set of virtual neighbors comprising one or more inverters of the first set of inverters.

Aspect 5: The system of any preceding aspect, wherein the instructions that, if executed at the one or more processors, configure the system to determine the set of virtual neighbors further comprise instructions that, if executed at the one or more processors, configure the system to: calculate a correlation matrix indicating a correlation of operating conditions between each inverter of the first set of inverters, wherein the set of virtual neighbors comprise one or more inverters of the first set of inverters having a correlation below a threshold.

Aspect 6: The system of any preceding aspect, wherein the one or more inverters of the set of virtual neighbors are distributed across a large geographic installation site or across two or more different geographic installation sites.

Aspect 7: The system of any preceding aspect, wherein: a second controller of the second control layer is associated with a second set of inverters; and the first set of inverters and the second set of inverters are distributed across overlapping geographic areas.

Aspect 8: The system of any preceding aspect, wherein the executable instructions further comprise instructions that, if executed at the one or more processors, configure the system to: receive, at the third control layer, a request signal associated with one or more ancillary services, wherein determining the net power request is based at least in part on receiving the request signal.

Aspect 9: The system of any preceding aspect, wherein the one or more ancillary services comprise voltage support, frequency response, or other ancillary service requests.

Aspect 10: The system of any preceding aspect, wherein one or more of the first control layer, the second control layer, or the third control layer have a predictive forecasting capability, the predictive forecasting capability comprising a capability to determine a near-term to long-term approximation of a generation potential.

Aspect 11: The system of any preceding aspect, wherein the instructions that, if executed at the one or more processors, configure the system to determine the inverter maximum power potential further comprise instructions that, if executed at the one or more processors, configure the system to: calculate the inverter maximum power potential iteratively for each inverter of the first set of inverters at a first time interval that is less than a second time interval associated with solar or wind variation.

Aspect 12: The system of any preceding aspect, wherein the instructions that, if executed at the one or processors, configure the system to determine the initial combined power output further comprise instructions that, if executed at the one or more processors, configure the system to: calculate, at the first control layer and for each inverter of the first set of inverters, a residual generation signal based at least in part on comparing the inverter maximum power potential and a generation set point; and transmit, from the first control layer to the first controller of the second control layer, an indication of the residual generation signal for each inverter of the first set of inverters, wherein the initial combined power output is based at least in part on a sum of each residual generation signal of each inverter of the first set of inverters.

Aspect 13: The system of any preceding aspect, wherein: the first control layer comprises a set of control agents configured to control operating parameters associated with each inverter of the first set of inverters; the second control layer comprises a set of controllers configured to each manage a set of control agents associated with the first control layer; and the third control layer comprises a central controller configured to manage the set of controllers associated with the second control layer.

Aspect 14: The system of any preceding aspect, wherein the second control layer comprises one or more hierarchical sets of controllers.

Aspect 15: The system of any preceding aspect, further comprising one or more storage devices, wherein the executable instructions further comprise executable instructions that, if executed at the one or more processors, configure the system to: determine, at the second control layer, to direct power to the one or more storage devices.

Aspect 16: A method for power plant management, comprising: determining, at a first control layer, an inverter maximum power potential for each inverter of a first set of inverters, the first control layer integrated into each inverter of the first set of inverters, the first set of inverters associated with a first controller of a second control layer; determining, at the first controller of the second control layer, an initial combined power output associated with the first set of inverters, the initial combined power output based at least in part on the inverter maximum power potential for each inverter of the first set of inverters; determining, at the first controller of the second control layer, a power support level, the power support level based at least in part on comparing the initial combined power output and a requested power generation level; transmitting, from the first controller of the second control layer to a third control layer, an indication of the power support level; determining, at the third control layer, a first net power request for the first controller of the second control layer based at least in part on the indicated power support level; and transmitting, from the third control layer to the first controller of the second control layer, an indication of the first net power request.

Aspect 17: The method of any preceding aspect, further comprising: determining, at the third control layer, a second net power request for a second controller of the second control layer based at least in part on the indicated power support level associated with the first control of the second control layer, the second controller of the second control layer associated with a second set of inverters; and transmitting, from the third control layer to the second controller of the second control layer, an indication of the second net power request.

Aspect 18: The method of any preceding aspect, further comprising: determining, at the first controller of the second control layer, a set of virtual neighbors, the set of virtual neighbors comprising one or more inverters of the first set of inverters.

Aspect 19: A non-transitory computer-readable medium comprising one or more computer-readable storage media having stored thereon computer-executable instructions that, if executed at a processor, cause a computer system to perform a method for power plant management, the method comprising: determining, at a first control layer, an inverter maximum power potential for each inverter of a first set of inverters, the first control layer integrated into each inverter of the first set of inverters, the first set of inverters associated with a first controller of a second control layer; determining, at the first controller of the second control layer, an initial combined power output associated with the first set of inverters, the initial combined power output based at least in part on the inverter maximum power potential for each inverter of the first set of inverters; determining, at the first controller of the second control layer, a power support level, the power support level based at least in part on comparing the initial combined power output and a requested power generation level; transmitting, from the first controller of the second control layer to a third control layer, an indication of the power support level; determining, at the third control layer, a first net power request for the first controller of the second control layer based at least in part on the indicated power support level; and transmitting, from the third control layer to the first controller of the second control layer, an indication of the first net power request.

Aspect 20: The non-transitory computer-readable medium of any preceding aspect, wherein the computer-executable instructions further comprise computer-executable instructions that, if executed at a processor, cause the computer system to perform the method comprising: determining, at the third control layer, a second net power request for a second controller of the second control layer based at least in part on the indicated power support level associated with the first control of the second control layer, the second controller of the second control layer associated with a second set of inverters; and transmitting, from the third control layer to the second controller of the second control layer, an indication of the second net power request.

The described examples are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A system for power plant management, comprising:

one or more processors; and one or more computer-readable media having stored thereon executable instructions that, if executed at the one or more processors, configure the system to perform at least the following:

determine, at a first control layer, an inverter maximum power potential for each inverter of a first set of inverters, the first control layer integrated into each inverter of the first set of inverters, the first set of inverters associated with a first controller of a second control layer;

determine, at the first controller of the second control layer, an initial combined power output associated with the first set of inverters, the initial combined power output based at least in part on the inverter maximum power potential for each inverter of the first set of inverters;

determine, at the first controller of the second control layer, a power support level, the power support level based at least in part on comparing the initial combined power output and a requested power generation level;

transmit, from the first controller of the second control layer to a third control layer, an indication of the power support level;

determine, at the third control layer, a first net power request for the first controller of the second control layer based at least in part on the indicated power support level;

transmit, from the third control layer to the first controller of the second control layer, an indication of the first net power request;

determine, at the third control layer, a second net power request for a second controller of the second control layer based at least in part on the indicated power support level associated with the first controller of the second control layer, the second controller of the second control layer associated with a second set of inverters; and transmit, from the third control layer to the second controller of the second control layer, an indication of the second net power request.

2. The system of claim 1, wherein:

the first set of inverters are distributed across a power plant comprising one or more geographic installation sites; and the first set of inverters are configured to communicate wirelessly within the first set of inverters or with a controller of the second control layer.

3. The system of claim 1, wherein the executable instructions further comprise instructions that, if executed at the one or more processors, configure the system to:

determine, at the first controller of the second control layer, a set of virtual neighbors, the set of virtual neighbors comprising one or more inverters of the first set of inverters.

4. The system of claim 3, wherein the instructions that, if executed at the one or processors, configure the system to determine the set of virtual neighbors further comprise instructions that, if executed at the one or more processors, configure the system to:

calculate a correlation matrix indicating a correlation of operating conditions between each inverter of the first set of inverters, wherein the set of virtual neighbors comprise one or more inverters of the first set of inverters having a correlation below a threshold.

5. The system of claim 3, wherein the one or more inverters of the set of virtual neighbors are distributed across a large geographic installation site or across two or more different geographic installation sites.

6. The system of claim 1, wherein:

a second controller of the second control layer is associated with a second set of inverters; and the first set of inverters and the second set of inverters are distributed across overlapping geographic areas.

7. The system of claim 1, wherein the executable instructions further comprise instructions that, if executed at the one or more processors, configure the system to:

receive, at the third control layer, a request signal associated with one or more ancillary services, wherein determining the net power request is based at least in part on receiving the request signal.

8. The system of claim 7, wherein the one or more ancillary services comprise voltage support, frequency response, or other ancillary service requests.

9. The system of claim 1, wherein one or more of the first control layer, the second control layer, or the third control layer have a predictive forecasting capability, the predictive forecasting capability comprising a capability to determine a near-term to long-term approximation of a generation potential.

10. The system of claim 1, wherein the instructions that, if executed at the one or processors, configure the system to determine the inverter maximum power potential further comprise instructions that, if executed at the one or more processors, configure the system to:

calculate the inverter maximum power potential iteratively for each inverter of the first set of inverters at a first time interval that is less than a second time interval associated with solar or wind variation.

11. The system of claim 1, wherein the instructions that, if executed at the one or processors, configure the system to determine the initial combined power output further comprise instructions that, if executed at the one or more processors, configure the system to:

calculate, at the first control layer and for each inverter of the first set of inverters, a residual generation signal based at least in part on comparing the inverter maximum power potential and a generation set point; and transmit, from the first control layer to the first controller of the second control layer, an indication of the residual generation signal for each inverter of the first set of inverters, wherein the initial combined power output is based at least in part on a sum of each residual generation signal of each inverter of the first set of inverters.

12. The system of claim 11, wherein the second control layer comprises one or more hierarchical sets of controllers.

13. The system of claim 1, wherein:

the first control layer comprises a set of control agents configured to control operating parameters associated with each inverter of the first set of inverters;

the second control layer comprises a set of controllers configured to each manage a set of control agents associated with the first control layer; and the third control layer comprises a central controller configured to manage the set of controllers associated with the second control layer.

14. The system of claim 1, further comprising one or more storage devices, wherein the executable instructions further comprise executable instructions that, if executed at the one or more processors, configure the system to:

determine, at the second control layer, to direct power to the one or more storage devices.

15. A method for power plant management, comprising:

determining, at a first control layer, an inverter maximum power potential for each inverter of a first set of inverters, the first control layer integrated into each inverter of the first set of inverters, the first set of inverters associated with a first controller of a second control layer;

determining, at the first controller of the second control layer, an initial combined power output associated with the first set of inverters, the initial combined power output based at least in part on the inverter maximum power potential for each inverter of the first set of inverters;

determining, at the first controller of the second control layer, a power support level, the power support level based at least in part on comparing the initial combined power output and a requested power generation level;

transmitting, from the first controller of the second control layer to a third control layer, an indication of the power support level;

determining, at the third control layer, a first net power request for the first controller of the second control layer based at least in part on the indicated power support level;

transmitting, from the third control layer to the first controller of the second control layer, an indication of the first net power request;

determining, at the third control layer, a second net power request for a second controller of the second control layer based at least in part on the indicated power support level associated with the first controller of the second control layer, the second controller of the second control layer associated with a second set of inverters; and transmitting, from the third control layer to the second controller of the second control layer, an indication of the second net power request.

16. The method of claim 15, further comprising:

determining, at the first controller of the second control layer, a set of virtual neighbors, the set of virtual neighbors comprising one or more inverters of the first set of inverters.

17. A non-transitory computer-readable medium comprising one or more computer-readable storage media having stored thereon computer-executable instructions that, if executed at a processor, cause a computer system to perform a method for power plant management, the method comprising:

determining, at a first control layer, an inverter maximum power potential for each inverter of a first set of inverters, the first control layer integrated into each inverter of the first set of inverters, the first set of inverters associated with a first controller of a second control layer;

determining, at the first controller of the second control layer, an initial combined power output associated with the first set of inverters, the initial combined power output based at least in part on the inverter maximum power potential for each inverter of the first set of inverters;

determining, at the first controller of the second control layer, a power support level, the power support level based at least in part on comparing the initial combined power output and a requested power generation level;

transmitting, from the first controller of the second control layer to a third control layer, an indication of the power support level;

determining, at the third control layer, a first net power request for the first controller of the second control layer based at least in part on the indicated power support level;

transmitting, from the third control layer to the first controller of the second control layer, an indication of the first net power request;

determining, at the third control layer, a second net power request for a second controller of the second control layer based at least in part on the indicated power support level associated with the first controller of the second control layer, the second controller of the second control layer associated with a second set of inverters; and transmitting, from the third control layer to the second controller of the second control layer, an indication of the second net power request.

* * * * *